Sept. 27, 1949.  C. W. F. HAMILTON  2,483,006
MACHINE FOR EARTH-WORKING, LOG-LIFTING,
STOCK-PILING OR THE LIKE
Filed June 30, 1944  6 Sheets-Sheet 1
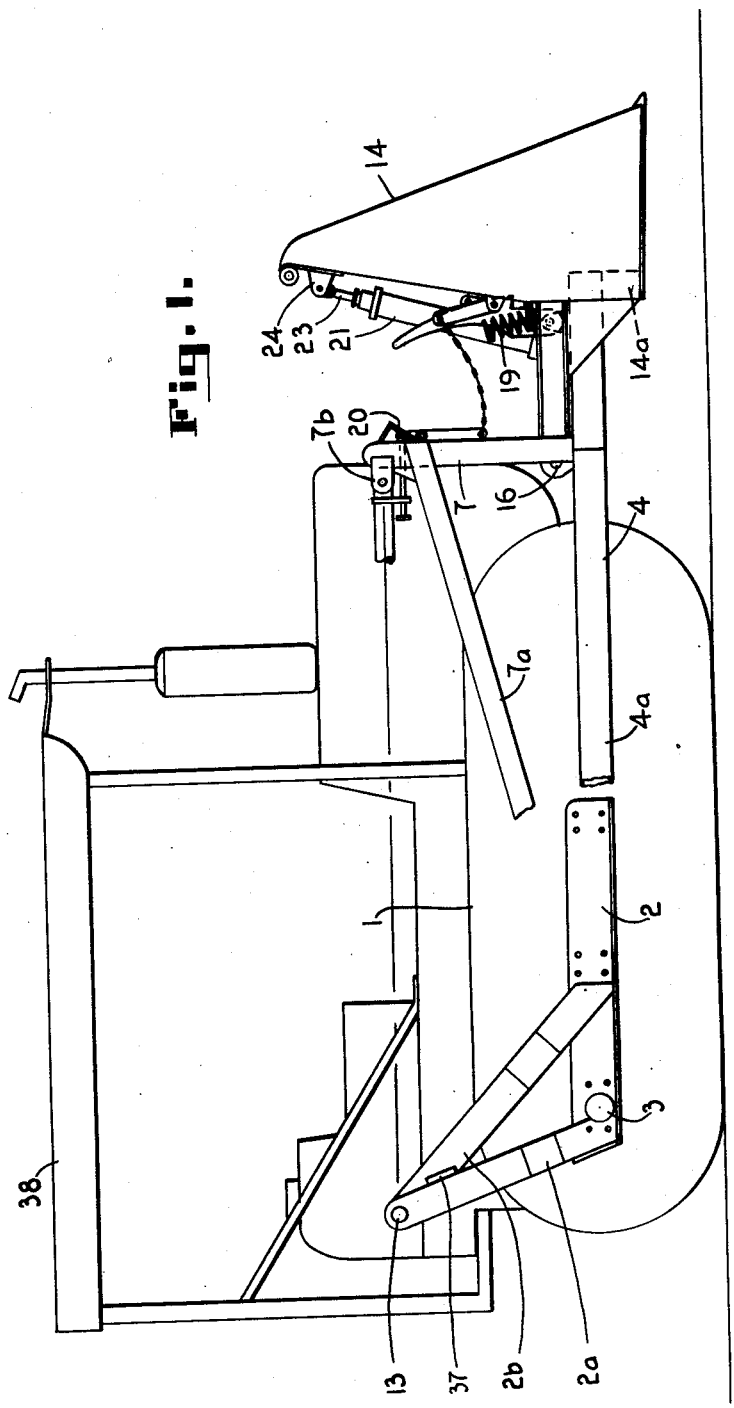
Inventor
C. W. F. Hamilton

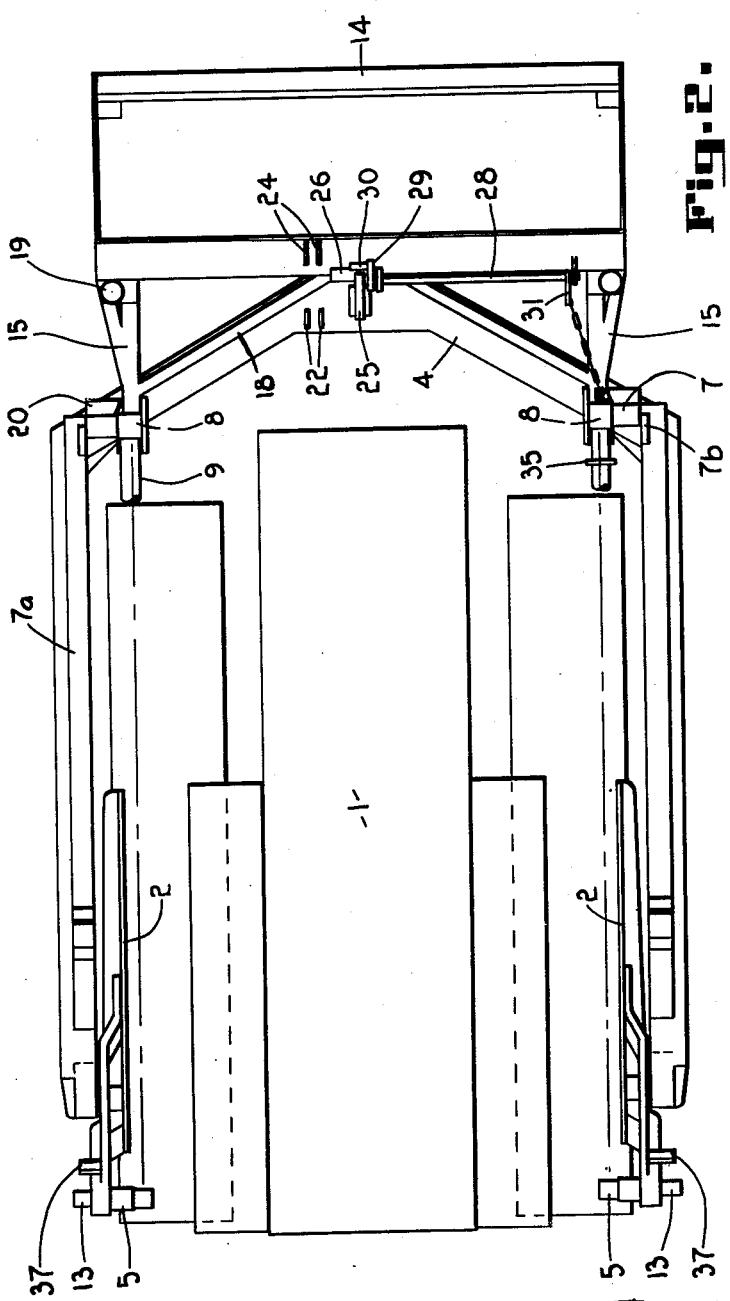

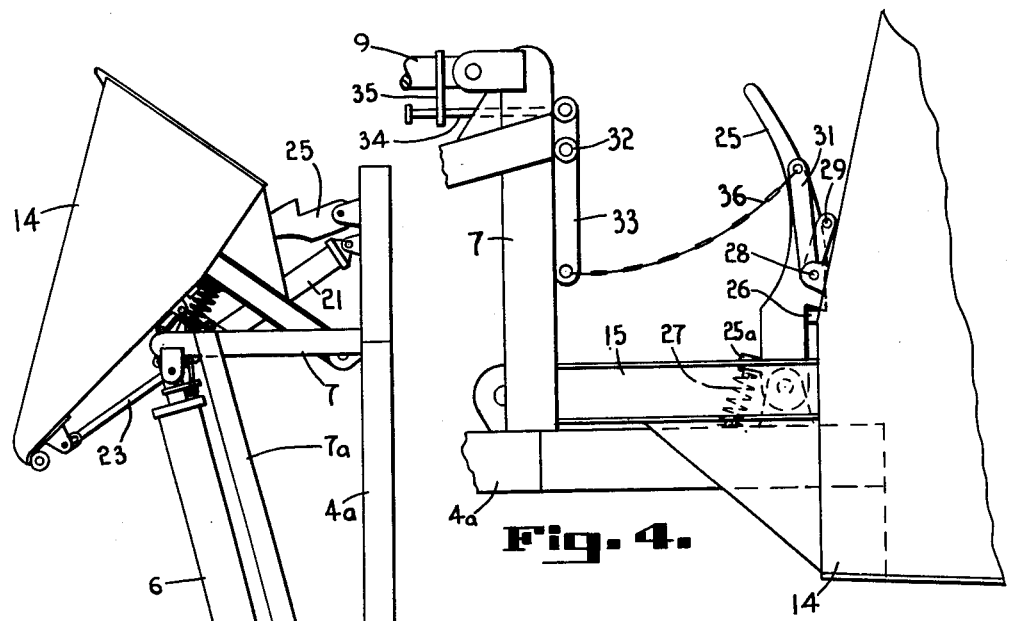
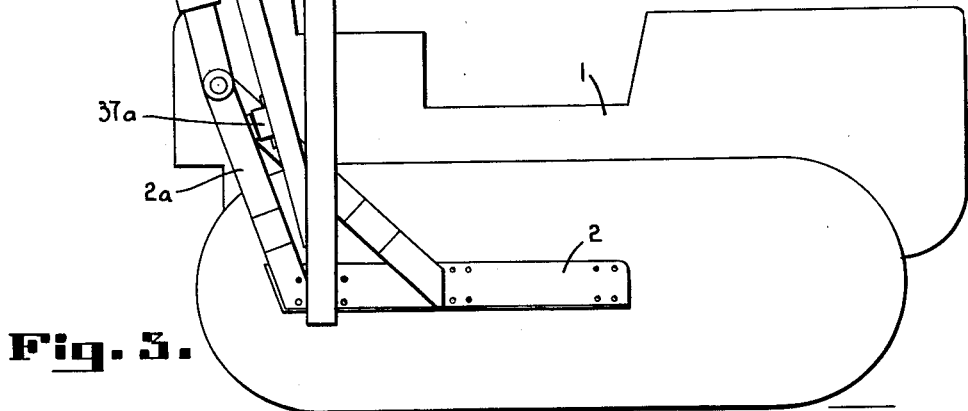

Inventor
C. W. F. Hamilton

Sept. 27, 1949.    C. W. F. HAMILTON    2,483,006
MACHINE FOR EARTH-WORKING, LOG-LIFTING,
STOCK-PILING OR THE LIKE
Filed June 30, 1944    6 Sheets-Sheet 6

Inventor
C. W. F. Hamilton

Patented Sept. 27, 1949

2,483,006

UNITED STATES PATENT OFFICE 2,483,006

MACHINE FOR EARTH-WORKING, LOG-LIFTING, STOCK-PILING, OR THE LIKE

Charles William Fielden Hamilton, Fairlie, New Zealand

Application June 30, 1944, Serial No. 543,014
In New Zealand August 9, 1943

1 Claim. (Cl. 214—140)

This invention relates to machines for earth-working, log-lifting, stock-piling or the like.

Previous tractor-loader machines of the rear dumping type have suffered from certain disadvantages. For instance the bucket to scoop up the earth has been of such length as to project over the back of the tractor when the yoke is in a substantially vertical position so as to discharge the contents over the back of said tractor, and such a bucket is unduly large and has been found to considerably impair visibility when the bucket is in lowered or scooping position.

The main object of this invention is to provide improvements in earth working machines of the rear dumping type whereby the above disadvantages are minimized.

The invention accordingly consists in an improved earth working machine consisting of a tractor or the like; a substantially U-shaped yoke passing around the front of the tractor or the like and pivotally mounted at or about its rear ends to mounting means carried by the tractor or the like; means to raise the yoke about its axis and a bucket pivotally mounted to the front of said yoke, said bucket when the yoke is lowered being adapted to scoop up earth when the tractor or the like is driven forwards, the pivotal mounting of said bucket to the yoke enabling the bucket to tilt rearwardly on being raised by said yoke to the requisite elevation to discharge its contents over the back of the tractor or the like.

The invention may in another aspect be said to consist in an improved machine for earth-working, log-lifting, stock-piling or the like; consisting of a tractor or the like; a U-shaped yoke passing around the front of same, said yoke being pivotally mounted at or about its rear ends to suitable mounting means carried by the tractor or the like; an upwardly projecting post at each side rigidly mounted near the front of said yoke; yoke raising means carried by said tractor or the like and adapted to exert a rearward pull on the upper ends of said posts; and an attachment for earth-working, or an attachment for log-lifting, or an attachment for stock-piling, attachable to said yoke in front of the tractor or the like.

In this aspect of the invention, the attachment adapted to be attached to the yoke may be a bull-dozing or angle-dozing blade, a bucket-loader such as herein described and shown, or a log-lifting attachment, or a crane attachment such as hereinafter described and shown, all of these units being interchangeable.

The invention may also be said to consist in the other features and/or arrangements and/or combinations of parts herein described and shown and claimed in the appended claim.

The invention will now, however, be described with reference to the accompanying drawings, which show one form of the invention, with various attachments as above referred to.

In the drawings,

Figure 1 is a part side elevation of a machine according to the invention, with the yoke and a post stay shown broken away to show other details of construction, the center-line of one of the hydraulic rams being shown.

Figure 2 is a plan of the machine, the dash-pot being omitted and the center-lines of the hydraulic rams being shown.

Figure 5:
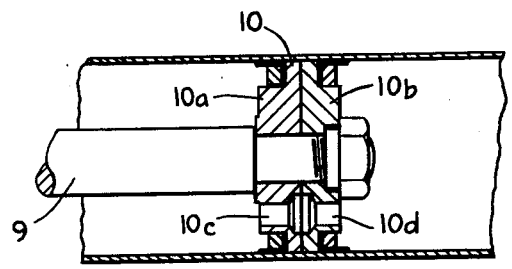
Figure 6:
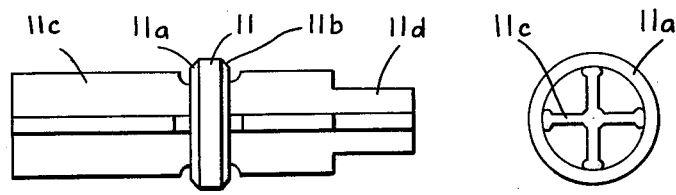
Figure 7:
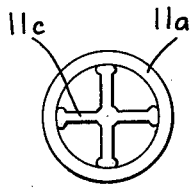
Figure 8:
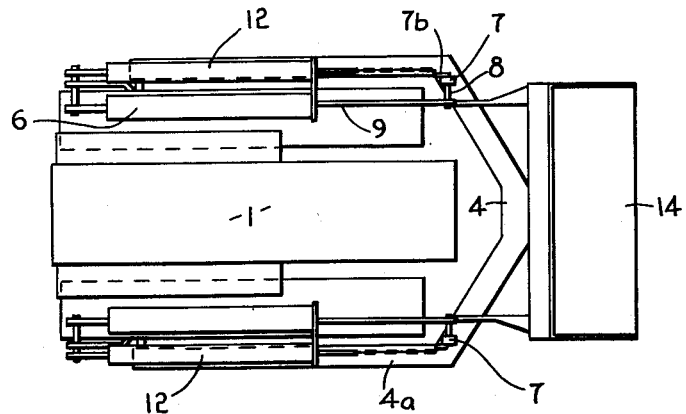

Figure 3 is a side elevation of the machine, with the yoke raised to vertical position and the bucket released, Figure 4 is a side elevation of the bucket releasing mechanism, on a larger scale than Figures 1 to 3, with various adjacent parts omitted for clarity, Figure 5 is a part longitudinal section through one of the hydraulic rams, on a larger scale than Figures 1 to 4, showing the way the piston is constructed to house the relief valve, Figure 6 is a side elevation of the relief valve, on a larger scale than Figure 5, Figure 7 is an end elevation of the relief valve, Figure 8 is a simplified plan of the machine, on a smaller scale than Figures 1 to 7, showing the spring booster for assisting in the raising of the yoke.

Figure 9:
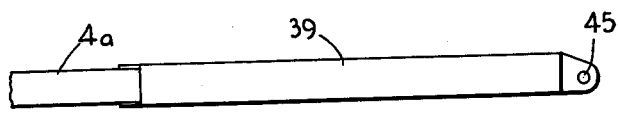

Figure 9 is a side elevation of a crane attachment, on about the same scale as Figures 1 to 3, Figure 10 is a plan of such attachment, on the same scale.

Figure 10:
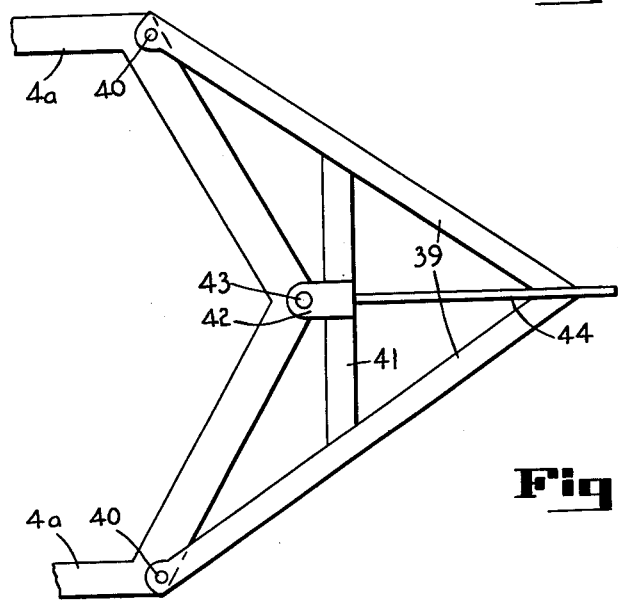
Figure 11:
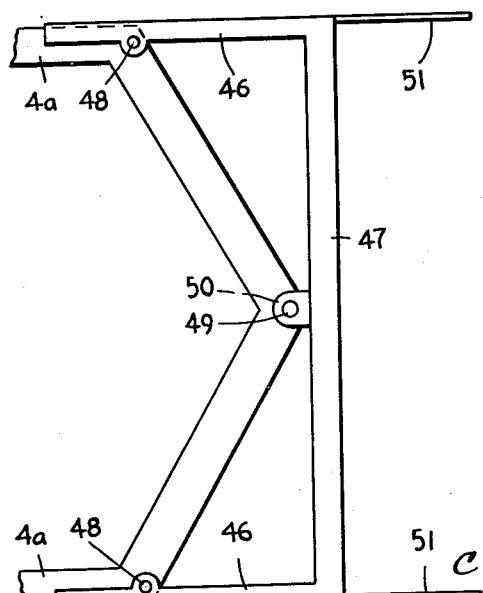
Figure 12:
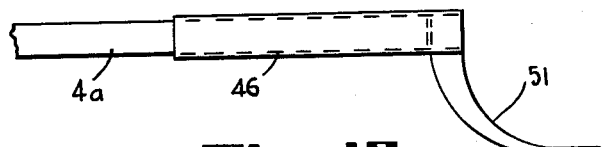
Figure 13:
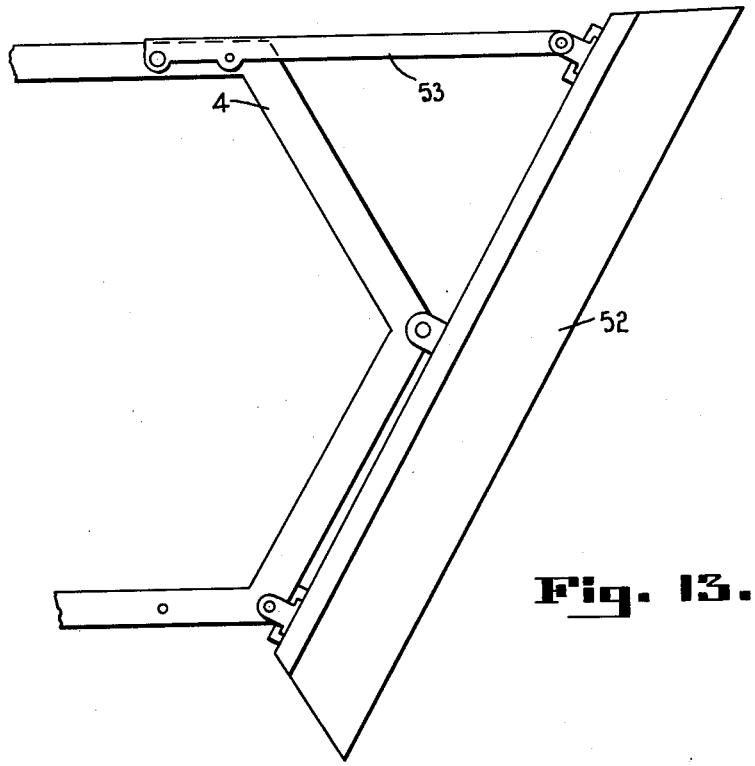

Figure 11 is a plan of a log-lifting attachment on the same scale as Figures 9 and 10, Figure 12 is a side elevation thereof, on the same scale, and Figure 13 is a plan of a bull-dozing or angle-dozing blade attachment on the same scale.

In the form of the invention shown, wherein the invention is applied to a crawler tractor 1, and the yoke raising means comprise hydraulic rams, a substantially horizontal bracket 2 is rigidly secured to the track roller frame on each side. At or near the rear end of each bracket 2 a short shaft 3 projects outwardly. The brackets 2 are preferably so positioned that the short shafts 3 are in axial alignment with the track pivot point.

The shafts 3 constitute mounting means for a U-shaped yoke 4 which has at its rear ends bearings pivotally mounted to said shafts. The U-shaped yoke passes around the front of the tractor.

Extensions 2a of the brackets 2 extend upwardly and slightly rearwardly of the short shafts 3 to a position above and clear of the tracks, stays 2b (Figure 1) being provided projecting from the top of said bracket extensions 2a to a point about half-way along the brackets 2.

At about the top of each bracket extension 2a a short shaft 5, Figure 2, projects inwardly and to such short shaft is pivotally attached or anchored the rear end of a hydraulic ram 6, Figures 3 and 8.

Two posts 7 are rigidly secured to the yoke at about the front of each side member 4a of the yoke, each post 7 being stayed by a stay 7a secured at one end to a point near the top of said post and at the other end to a point on the side of the yoke rearward of said post.

At or about the top of each post 7 a short shaft 8 projects inwardly, and thereon is pivotally mounted the forward end of the ram piston rod 9.

The post 7 and bracket extension 2a are of such height that when the yoke is horizontal the rams are substantially parallel therewith.

The hydraulic rams 6 are of a known type, and the supply and control means therefor may be constructed and arranged in any known manner. It will be seen that by the above described means when oil is introduced under pressure to the front of the rams the ensuing contraction of the rams will lift the yoke, which can be lifted to a substantially vertical position over the tractor as shown in Figure 3. By causing oil to be introduced under pressure to the back of the rams the ensuing extension of the rams will lower the yoke to the desired extent. The yoke may thereby be forced downwardly as may be necessary to enable earth to be scooped up by the bucket (hereinafter described) and also as may be necessary when a bulldozer or angledozer blade is attached to the yoke. The yoke can be retained in any intermediate position as desired.

Means may be provided to avoid or minimize undue pressure in the oil system when the yoke is fully raised or lowered, and said means may take the form shown in Figures 5 to 7, in which provision is made so that when the piston 10 of the ram is almost at either end of its working stroke the oil is bye-passed through a relief valve located in the piston.

The piston comprises two halves or discs 10a and 10b bolted together. Holes 10c and 10d are provided through these two halves, in alignment with each other, the adjacent end portions of the two holes being enlarged to form two opposed valve recesses facing one another, with opposed bevelled valve seats located for instance about 1½ inch apart.

A relief valve 11 shown in Figures 6 and 7 is adapted to be located in the valve recesses, and has two oppositely disposed valve faces 11a and 11b, one on each side, and from either side of the relief valve webbed guides 11c and 11d project axially, being a sliding fit in the holes 10c and 10d in the piston, while the valve faces, being of a greater diameter than the holes, can seat on either of the piston valve-seats.

The proportions are such that the relief valve can move axially for a distance of say ⅜ inch from one seat to the other, while when the piston is moving in either direction under oil pressure, with the valve guide 11c or 11d projecting in the direction of travel, the end of the guide will strike the front or back head of the ram, for instance when the piston is within about 1/16 inch of the end of its travel.

In operation, oil being admitted under pressure to one side of the piston, the relief valve is forced to the opposite seat by oil pressure and the piston is moved by the oil pressure. When the projecting relief valve guide strikes the cylinder end, it stops so that continued movement of the piston opens the valve, allowing the oil to be by-passed through the valve openings 10c and 10d, so relieving the oil pressure on the piston and in the oil line. When the oil is caused to flow to the opposite side of the piston the valve is forced onto the opposite seat and so closes the by-pass till such time as the piston reaches either end of its travel again.

To assist the rams in lifting the yoke, spring boosters are connected between the posts 7 and the bracket extensions 2a on each side of the tractor. Referring to Figures 1, 2, 3, 4 and 8, a known type of spring-tension means or booster 12 embodying a compression spring is connected between a small lug 7b carried by each post, and a short shaft 13 carried by the bracket extensions 2a, the shafts 13 being preferably in alignment with, and integral with, the shafts 5. The springs exert their greatest pull through the first part of the yoke lifting movement, when the assistance is wanted most.

A bucket 14, suitably shaped for picking up the spoil, on the tractor being driven forward with the yoke in the appropriate position, as shown in Figure 1, is detachably secured across the front of the yoke in the following manner:

An arm 15, Figures 2 and 4, is rigidly secured to each side of the bucket 14 and extends rearwardly to the yoke, being detachably pivotally attached at 16, Figure 1, to brackets carried by the yoke in such manner as to allow the bucket assembly to tip as hereinafter described. A stay 18 is provided at each side projecting inwards at an angle from the rearwardly extending arm 15 to about the middle of the back of the bucket.

Pivotal movement of the bucket 14 about the pivots 16 is limited in either direction as follows:

A recess 14a of suitable height is formed in the lower part of the rear of the bucket, a stop with a rubber buffer on its underside (not shown herein) being located in said recess so as to rest on the forward part of the yoke when the bucket is in loading or "scooping" position, so as to support the bucket and load.

On brackets carried by the forward ends of the rearwardly projecting arms 15 of the bucket two upwardly projecting heavy compression springs or buffers 19 are mounted, and on the posts 7 at the front of the yoke are provided suitable stop plates 20 which the compression springs or buffers 19 will strike when the bucket tips rearwardly, to cushion the rearward fall of the bucket.

A dash-pot 21, which may be substantially of orthodox form, is provided to assist in cushioning the fall of the bucket in either direction. The dash-pot is pivotally mounted at its lower end to two lugs 22, Figure 2, carried by the yoke near but to one side of, the middle of the yoke. At the upper end of the dash-pot piston rod 23 is provided a slotted eye which is engaged by a pin held between two lugs 24 located on the back of the bucket. When the bucket tips in either direction it therefore has a small free movement to get under way before actuating the dash-pot. Considering first the rearward fall of the bucket the dash-pot regulates the speed of fall of the bucket until the latter is checked from further movement by the spring buffers 19 engaging the stop plates 20. When the yoke 4 is brought forward again and the bucket falls forward on the yoke to its loading or "scooping" position, the dash-pot again steadies the fall of the bucket.

To ensure that the bucket will not fall rearwardly before the yoke has reached the requisite elevation, catch and release means are provided, being constructed as follows; referring mainly to Figures 2 and 4:

A hook 25 is pivotally mounted near the front of the yoke and engages a catch plate 26 secured to the bucket. A compression spring 27 located under a projection 25a on the rear of the hook holds said hook in engagement with the catch plate 26 until the hook is released as hereinafter described.

The front face of the hook 25 is curved or inclined steeply back, to form a cam face.

A transverse shaft 28 is carried in bearings carried by the bucket assembly. The inner end of the shaft 28 carries, adjacent to the hook, an upwardly projecting lever 29 from which projects a pin 30 adapted to engage the curved cam face of the hook. Appropriate pivotal movement of the shaft 28 causes the pin 30 to so coact with the said cam face as to bring the hook out of engagement with the catch plate 26.

Fixed to the outer part of the shaft 28 is an upwardly projecting lever 31. To the post 7, on the same side of the yoke 4 as the lever 31, is mounted a bearing 32 pivotally carrying a lever 33 which is pivoted thereto near its upper end and is normally dependent in a substantially vertical position.

Pivotally attached to the top of the lever 33 is a shaft 34 projecting rearwards slightly below and normally parallel with the piston rod 9 of the ram, and passing through an eye 35 which is attached to the piston rod 9 near its forward end.

To the bottom end of the lever 33 is attached a chain 36 the other end of which is attached to the top of the lever 31.

The arrangement of the shaft 34, lever 33, chain 36, transverse shaft 28 and hook 25 is such that when the ram piston rods have moved almost completely into the ram cylinders on contraction of the ram, i. e. when the yoke is substantially vertical, the end of one of the ram cylinders (on the side where the hook release mechanism is located) will push forward the shaft 34, thereby causing the lever 33 to pull the chain 36 which by pulling back the lever 31 on the shaft 28 causes pivotal movement of said shaft, resulting in the releasing of the hook 25 as described above.

The releasing of the hook 25 by pivotal movement of the shaft 28, instead of being done automatically, could be effected by the driver of the tractor pulling a chain or the like appropriately placed and connected to the top of the lever 31.

The bucket is so shaped that, as it is being loaded, its bottom side, which is flat, is nearly horizontal, its upper side being longer than its bottom side and the front of the bucket being open. The front or cutting edge 14b of the bucket is removable and is made of hardened steel.

In the loading operation the bucket is held firmly in position by gravity and the hook 25 engages over the catch plate 26.

The yoke is adjusted by appropriate operation of the rams to the appropriate position for loading spoil into the bucket. On the tractor being driven forward, spoil is picked up by the bucket, and when a sufficient amount is loaded in the bucket the rams are operated so as to lift the yoke and with it the bucket. The lifting is continued until the yoke is substantially vertical, during which operation the tractor may be driven backwards to the appropriate place for dumping the spoil, as, for instance, up to a truck. A suitably positioned stop 37 is provided on one or both bracket extensions 2a to prevent the yoke moving beyond the desired substantially vertical position; rubber buffers 37a may be provided on the stays 7a to contact said stop 37, as is shown in Figure 3.

Due to the shape of the bucket, as described above, on its being lifted the spoil tends to fall onto the longer side, so that the weight of the spoil tends to tip the bucket backwards about the pivots 16, but tipping is prevented by the catch plate 26 being engaged by the hook.

When the yoke reaches the requisite substantially vertical position and the hook is released, as before described, the bucket tips backwards about the pivots 16, the contents being emptied behind the tractor, for instance into a truck.

To return the bucket to loading position, the yoke is moved downwards by operation of the rams, and when it has moved sufficiently downwards the bucket by its weight falls back to its loading or "scooping" position on the yoke, the rubber buffer and dash-pot cushioning the impact. As the bucket falls, the hook is pushed back, said hook then engaging over the catch plate 26. On the yoke being brought to the appropriate position the bucket is again in position for picking up a further load of spoil.

The invention, so far as it relates to an earthworking machine as above described, would normally be applied to a tractor having a cab 38 as shown in Figure 1, for the protection of the driver.

The bucket and its associated tipping mechanism can be detached from the yoke by detaching the arms 15 from the yoke and releasing the hook 25 from the catch plate 26.

Figures 9 and 10 show a crane attachment for use in stock-piling and for other purposes, the construction being as follows:

Two converging channel-members 39 are provided, and have their rear ends located about the forward ends of the yoke side members 4a and secured by vertical pins, bolts or the like 40 passing through said channel-members and through the holes provided in the yoke for the attachment of the side blade stays of a bulldozer or angle-dozer blade as will be hereinafter described. A connecting member 41 is located for instance about mid-way along the channels 39, said connecting member having rearwardly projecting lugs 42 thereon for mounting of the attachment to the yoke by a substantially vertical pin, bolt or the like 43 located in the hole provided in the front of the yoke for centrally securing the angle-dozer or bull-dozer blade. To the middle of the front of the connecting member 41 is attached the rear end of a member 44 which projects forwards, having the forward ends of the converging channel members 39 secured to either side near its forward end, and a hole 45 in front of said channel members for lifting purposes.

Figures 11 and 12 show a log-lifting attachment which is constructed as follows:

Two parallel side channel members 46 are located one on each side of the yoke, with their channels located about the forward ends of the yoke side members 4a, and are connected at their forward ends to a cross-member 47 located across the front of the yoke 4. The channel members 46 are detachably secured to the yoke by means of vertical pins, bolts or the like 48 passing through the said channel members and the yoke, through the holes provided in the yoke for attachment of the side blade stays of an angle-dozer or bull-dozer blade. The middle of the cross-member 47 is detachably secured to the middle front of the yoke 4 by means of a substantially vertical pin, bolt or the like 49 passing through suitable lugs 50 carried by the cross-member and through the hole provided in the yoke for centrally attaching the bull-dozer and the like blade.

At or near the ends of the cross-member 47 there are provided curved log-lifting or carrying prongs or tines 51 which curve downwards and forwards.

Figure 13 shows an angle-dozing blade 52 attached to the yoke 4, with one side blade stay 53 in use in known manner for angle-dozing. For bull-dozing, two such stays are used and are secured in known manner to the yoke so that the blade will be straight across the front of the yoke. Whether bull-dozing or angle-dozing, the conventional means may be employed to enable the blade to be set when desired to dig deeper at one side than at the other.

It will be obvious that the invention described herein can be utilized for many purposes apart from earth-working, including the piling up of stock of many descriptions such as cases, bituminous surfacing, bags or bales, railway lines and the like.

Instead of a crawler tractor my above described invention could be adapted for use with a normal wheeled type tractor, with of course the necessary and obvious modifications in the attachment of the yoke and rams to the tractor.

I claim:

In combination, a tractor, a yoke pivotally secured to one end of the tractor and passing around the other end thereof and movable to a vertical discharge position, a bucket, arms carried by said bucket and pivotally secured to said yoke in such manner that in the loading position of the bucket the arms and yoke are in substantially parallel relation whereas when said yoke is raised to vertical discharge position the arms swing out from the yoke by gravity and displace the bucket to a position to discharge its contents in a direction to clear the tractor, means to raise and lower said yoke, means to lock the bucket in operative position with respect to the yoke and said raising and lowering means including a hydraulic ram having a part engageable with said lock means to release the latter.

CHARLES WILLIAM FIELDEN HAMILTON.

REFERENCES CITED

The following references are of record in the file of this patent:

UNITED STATES PATENTS

| Number | Name | Date |
| --- | --- | --- |
| 1,301,643 | Blank | Apr. 22, 1919 |
| 1,703,600 | Sell | Feb. 26, 1929 |
| 1,725,624 | Dixon | Aug. 20, 1929 |
| 1,740,786 | Rybeck | Dec. 24, 1929 |
| 1,742,494 | Clausen | Jan. 7, 1930 |
| 2,151,436 | Nicholas et al. | Mar. 21, 1939 |
| 2,296,827 | Andersen et al. | Sept. 29, 1942 |
| 2,304,282 | Ross | Dec. 8, 1942 |
| 2,310,284 | Gurries | Feb. 9, 1943 |
| 2,323,434 | Williams | July 6, 1943 |
| 2,335,231 | Armington et al. | Nov. 30, 1943 |
| 2,341,853 | Austin | Feb. 15, 1944 |
| 2,347,822 | Goldup | May 2, 1944 |